United States Patent [19]

Saito

[11] Patent Number: 4,727,484

[45] Date of Patent: Feb. 23, 1988

[54] MEMORY ADDRESS CONTROL APPARATUS WITH SEPARATE TRANSLATION LOOK ASIDE BUFFERS FOR A DATA PROCESSOR USING A VIRTUAL MEMORY TECHNIQUE

[75] Inventor: Masato Saito, Tokyo, Japan

[73] Assignee: Nippon Electric Co., Ltd., Tokyo, Japan

[21] Appl. No.: 945,991

[22] Filed: Dec. 24, 1986

Related U.S. Application Data

[60] Continuation of Ser. No. 673,452, Nov. 21, 1984, Division of Ser. No. 214,932, Dec. 10, 1980, Pat. No. 4,502,110.

[30] Foreign Application Priority Data

Dec. 14, 1979 [JP] Japan .................. 54-163260

[51] Int. Cl.$^4$ .............................. G06F 12/02
[52] U.S. Cl. .................................. 364/200
[58] Field of Search ... 364/200 MS File, 900 MS File

[56] References Cited

U.S. PATENT DOCUMENTS

| 4,355,355 | 10/1982 | Butwell et al. | 364/200 |
| 4,464,712 | 8/1984 | Fletcher | 364/200 |
| 4,500,952 | 2/1985 | Heller et al. | 364/200 |
| 4,502,110 | 2/1985 | Saito | 364/200 |
| 4,612,612 | 8/1986 | Woffinden et al. | 364/200 |
| 4,638,426 | 1/1987 | Chang et al. | 364/200 |

Primary Examiner—Raulfe B. Zache
Assistant Examiner—William A. Niessen
Attorney, Agent, or Firm—Sughrue, Mion, Zinn, Macpeak, and Seas

[57] ABSTRACT

A memory control apparatus for a data processor using a virtual memory technique includes two cache memories one for storing a portion of the instructions located in the main memory (MMU), the other for storing a portion of the operand data located in main memory. A separate translation look aside buffer (TLB) is connected to each cache memory, with the TLB connected to the cache memory storing instructions operating to translate logical addresses to real addresses in the MMU storing instructions, while the TLB connected to the cache memory storing operand data operating to translate logical addresses to real addresses in the MMU storing operand data.

1 Claim, 25 Drawing Figures

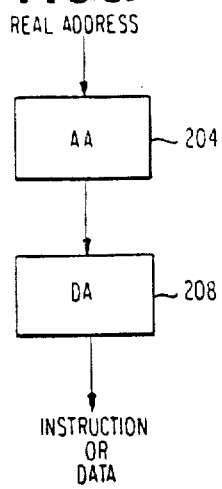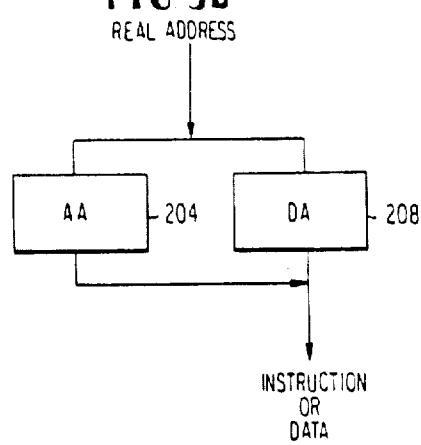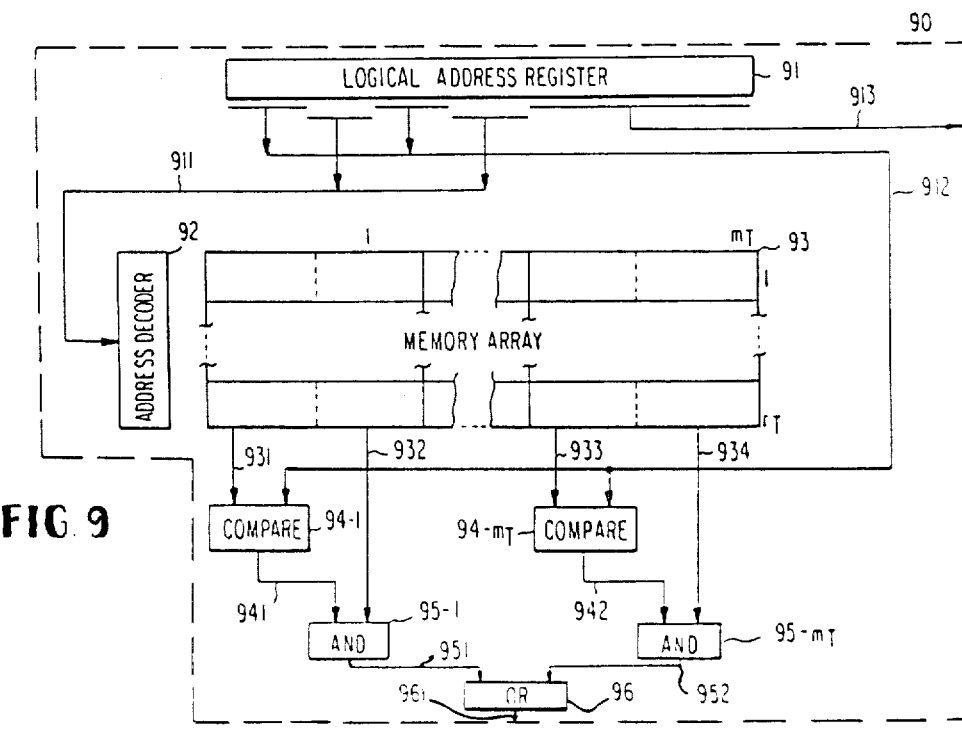

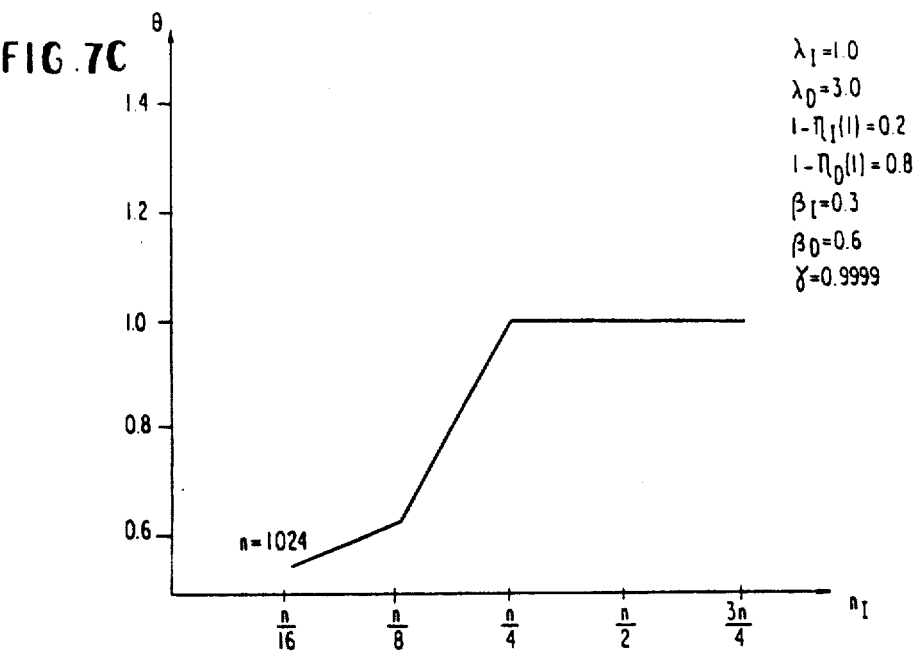
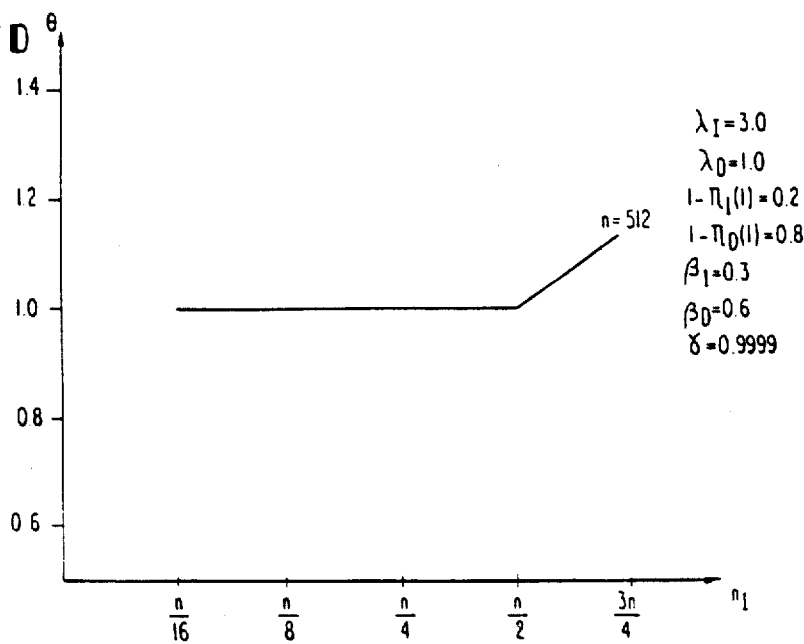

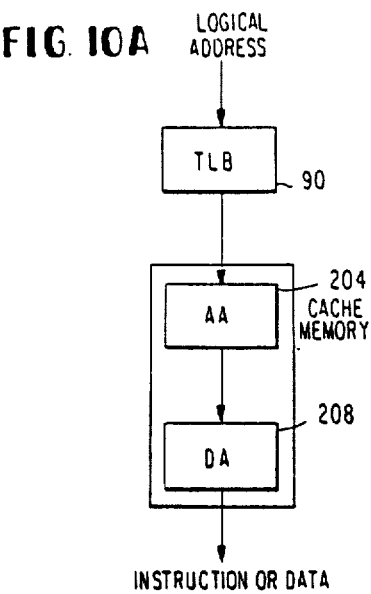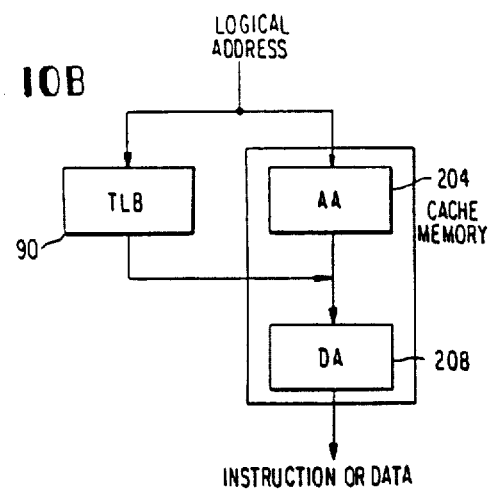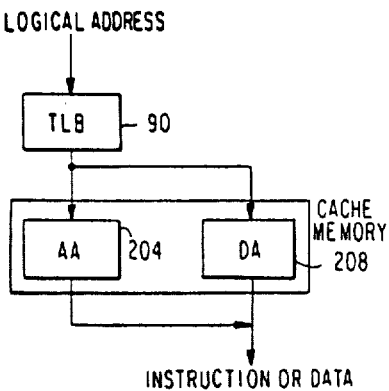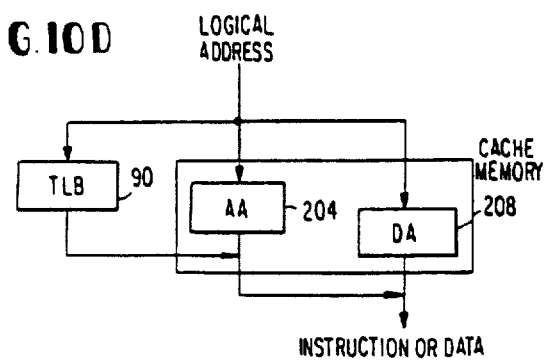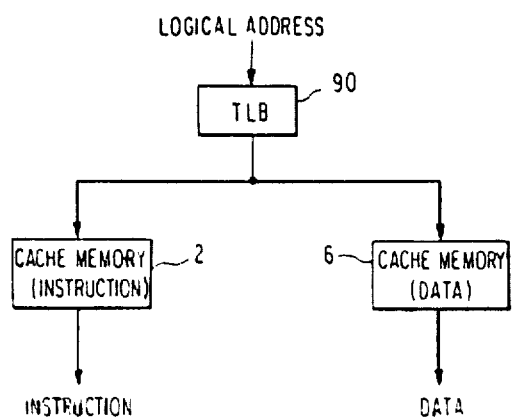

MEMORY ADDRESS CONTROL APPARATUS WITH SEPARATE TRANSLATION LOOK ASIDE BUFFERS FOR A DATA PROCESSOR USING A VIRTUAL MEMORY TECHNIQUE This is a continuation of application Ser. No. 673,452, filed Nov. 21, 1984, which is a division of application Ser. No. 214,932 filed Dec. 10, 1980 now U.S. Pat. No. 4,502,110, issued 02/26/85.

RELATED APPLICATIONS

This is a division of Ser. No. 214,932.

BACKGROUND OF THE INVENTION

The present invention relates to a memory address control apparatus for a data processing (DP) system and, more particularly, to a memory address control apparatus for a plurality of cache memories.

Recent improvements in packaging technology and IC (integrated circuit) and LSI (large-scale integration) technology has improved the processing speed of computers. This results in a large gap between the operation speed of a central processing unit (CPU) and the access speed for a main memory unit (MMU) having a large capacity. To reduce such a speed gap there is proposed a DP system equipped with a high speed buffer memory (or cache memory) having a small capacity for storing a copy of part of the main memory. For details of the proposed DP system, reference may be made to an article by J. S. Liptay, entitled "Structural aspects of the System/360 Model 85 II, the cache", IBM System Journal, Vol. 7, No. 1, pp. 15-21, 1968. To improve the processing speed of such a system, it is necessary to improve the MMU-access time and to enlarge the memory capacity of the cache memory (CM). For this purpose, an improved DP system is proposed in U.S. Pat. No. 3,618,041. The proposed system is equipped with two CMs for the data and instruction words. The processing speed of the whole system cannot be improved with this system, because attention is not paid to the capacity ratio of the two CMs used, even if the probability that the desired data is not stored in either CM (referred to hereunder as "missing probability") is maintained at a similar degree to that in the other DP system using one CM.

Also, another DP system using a virtual memory technique is disclosed in U.S. Pat. No. 3,317,898. For the efficient use of the MMU, this system has a directory memory for translating a logical address for the MMU into a corresponding real address for the MMU to dynamically relocate various programs on the MMU and thereby to use the MMU as a virtual memory having a memory capacity larger than the physical capacity of the MMU (see the U.S. Pat. No. 3,761,881 for details of such translating operation). For this DP system, the adoption of two CMs can be similarly considered. However, the system thus achieved has the same disadvantages for the same reasons as those stated above.

SUMMARY OF THE INVENTION

One object of the present invention is, therefore, to provide an improved memory address control apparatus capable of enhancing the whole processing speed of a DP system by the use of two translation look aside buffers one for instruction address translation and the other for operand data address translation between logical addresses and real addresses.

According to the present invention there is provided a memory address control apparatus for a data processor using a virtual memory technique, which is connected to a main memory unit (MMU) and a processing unit (PU) including an instruction fetch unit, an operand fetch unit, and an execution unit. The memory address control apparatus includes an instruction address translation look aside buffer for translating logical addresses to real addresses in the MMU at which instructions are stored and an operand data address translation look aside buffer for translating logical addresses to real addresses in the MMU at which operand data are stored. Each translation look aside buffer is connected to a respective cache memory, one for storing a copy of a portion of the operand data stored in the MMU, the other for storing a copy of a portion of the plurality of instruction words stored in the MMU. The memory capacities of the two cache memories are preferably equal.

BRIEF DESCRIPTION OF THE DRAWINGS

The present invention will be described in more detail with reference to the accompanying drawings in which:

FIGS. 3A and 3B show the relationship between an address array and a data array of FIG. 2;

FIGS. 4A and 4B are diagrams for describing the operation of each structure shown in FIGS. 3A and 3B;

FIGS. 7A-7D are additional plots showing the relationship of $\theta = (X_p/X_g)$ against the number of block cells, $n_I$, in the instruction cache memory, where the combined number of block cells, n, in the instruction and data cache memories and the parameters $\lambda_I$, $\lambda_D$, $1 - \pi_I(1)$, $1 - \pi_D(1)$, $B_I$, $B_D$ and $\gamma$ are as stated on the respective plots;

FIG. 9 is a diagram showing a second embodiment of the present invention;

FIGS. 10A through 10D are diagrams showing the relationship among a translation-look aside buffer, an address array, and a data array; and FIG. 11 is a diagram illustrating the disadvantages of the second embodiment.

In all the drawings, identical reference numerals denote identical structural elements.

DETAILED DESCRIPTION OF THE INVENTION

Figure 1:
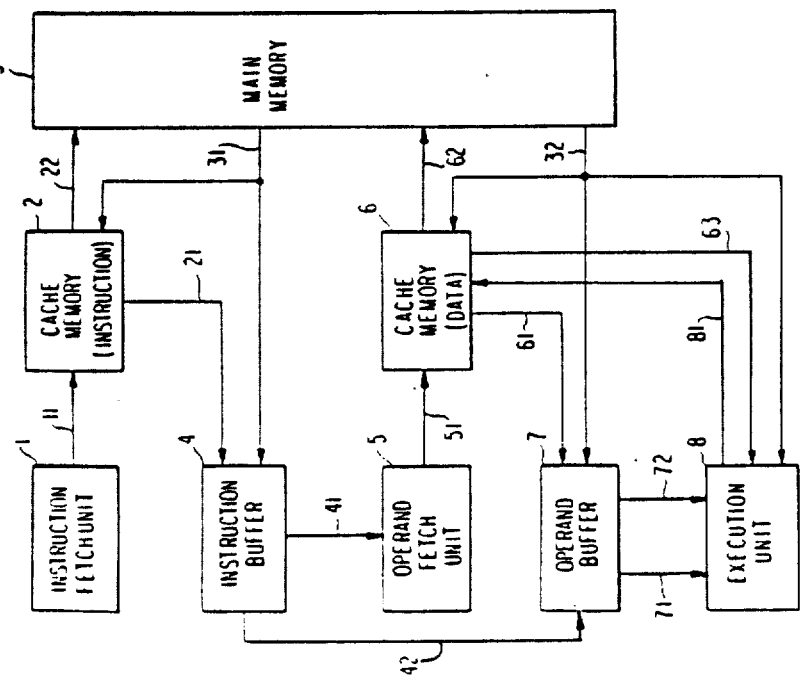
FIG. 1 is a block diagram of a first embodiment of the present invention.

Referring to FIG. 1, the first embodiment comprises an instruction fetch unit 1, cache memories (CMs) 2 and 6, a main memory (MM) 3, an instruction buffer 4, and operand fetch unit 5, an operand buffer 7, and an execution unit 8. The CMs 6 and 2 are provided, respectively, for the data and instruction storage, so that the capacity of each of the CMs 2 and 6 may be identical, having the same number of block cells and the same number of bytes in each block cell. Details of the CMs 2 and 6 will be discussed later.

Figure 7A:
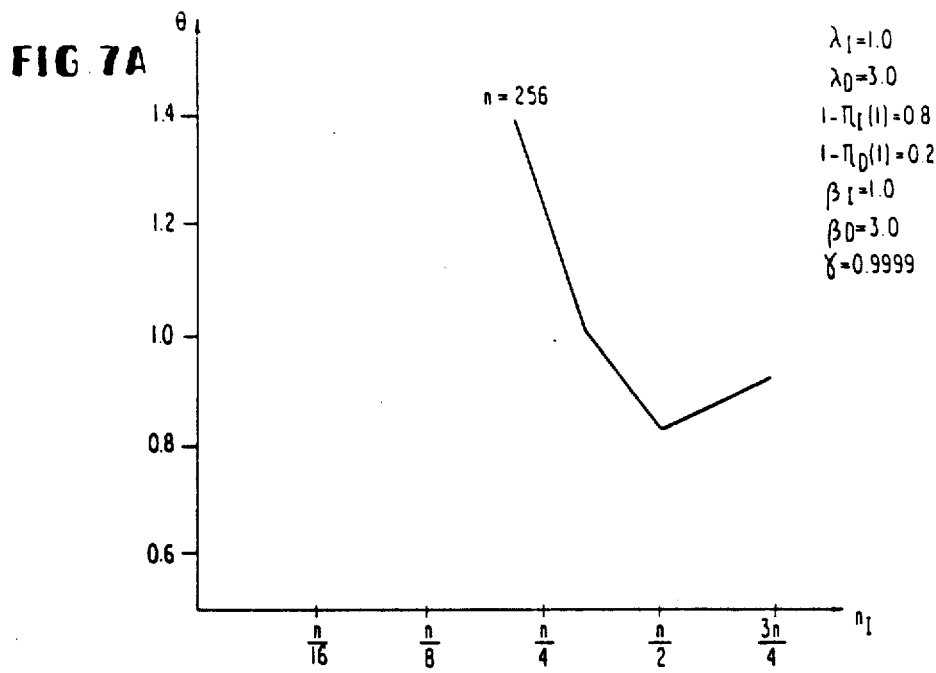
Figure 7B:
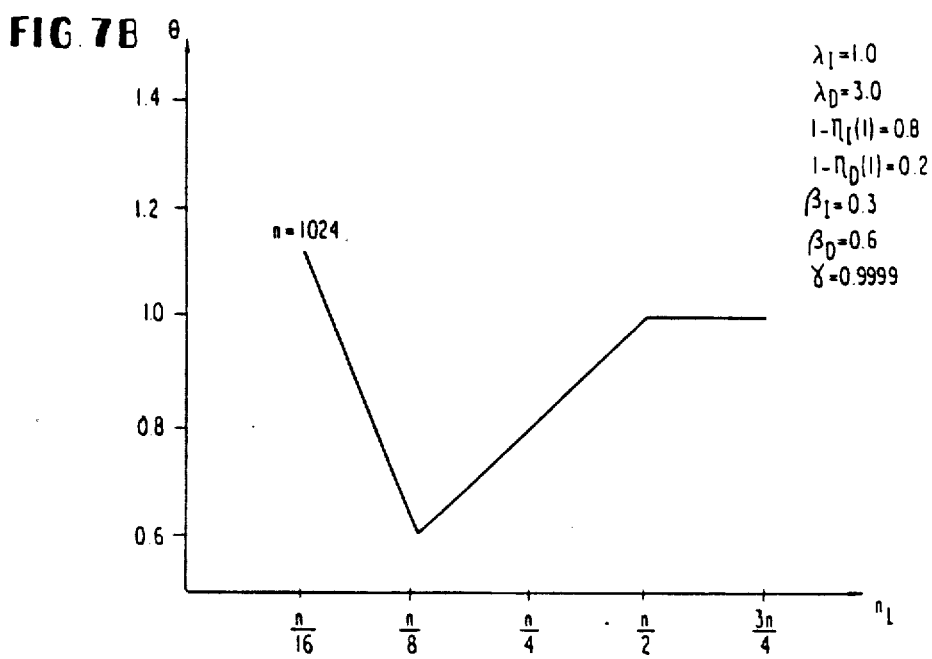

Next, the operation of the present invention is described when applied to a pipelined DP system. For the details of such a pipelined DP system, reference may be made to the U.S. Pat. No. 3,618,041, particularly to FIGS. 7A and 7B of the specification.

More specifically, the embodiment will be described in connection with one instruction stream selected out of a plurality of instruction streams, which operate in parallel with one another in the pipelined system.

In response to an instruction address and an instruction readout request given from the instruction fetch unit 1 to the instruction CM 2, an instruction is given to the instruction buffer 4 through a line 21 from the CM 2 provided the desired instruction word is in the CM 2.

In the absence of the instruction word in the CM 2, an address is given to the MMU 3 through a line 22, and the MMU 3 provides an instruction word to the buffer 4 and the CM 2 through a line 31.

The instruction word is then transferred from the buffer 4 to the operand fetch unit 5 to decode the instruction and to develope an operand address therefore. The operand address and and an operand read-out request are then sent from the unit 5 to the CM 6 to read out corresponding data.

In the presence of the desired data in the CM 6, the data is sent from the CM 6 to the operand buffer 7 through a line 61.

In the absence of the desired data in the CM 6, an address is sent from the CM 6 to the MMU 3 through a line 62 so that the desired data from the MMU 3 is sent to the buffer 7 and the CM 6 through a line 32. The instruction word and the operand data in the buffer 7 are sent from the buffer 7 to the execution unit 8 to execute the instruction. In response to a data fetch request from the unit 8, an address for reading out the data, in addition to a data read-out request, is given to the CM 6 from the unit 8 through a line 81.

If the desired data is present in CM 6, the data is read out of the CM 6 and sent to the unit 8 through a line 63. If the desired data is absent from the CM 6, the data is read out of MMU 3 and given to the unit 8 and the CM 6 through the line 32.

Figure 2:
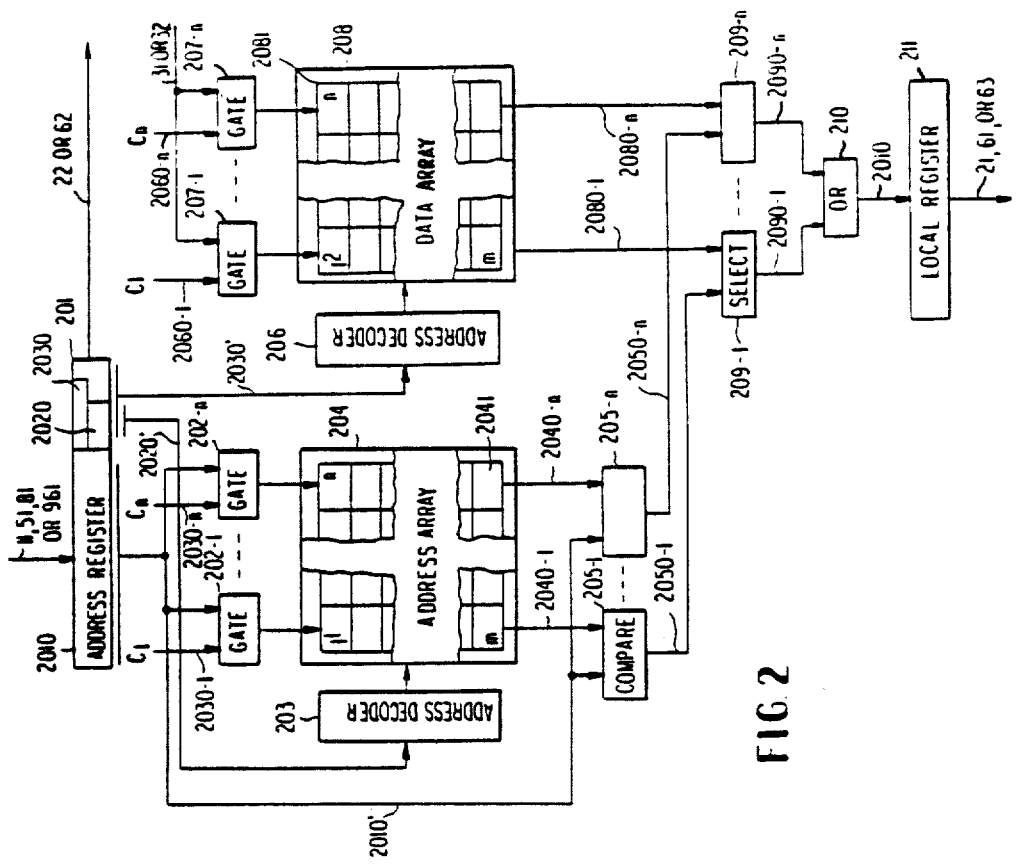
FIG. 2 is a diagram showing in detail a first embodiment of a cache memory constructed in accordance with the teachings of this invention.

As shown in FIG. 2, each of the CMs 2 and 6 has a similar structure. Referring to FIG. 2, the CM 2 (or 6) comprises an address array 204 and a data array 208. The data array 208 has m sets and n block cells 2081 (hereinafter each of the block cells is referred to as "compartment") per set. Each block cell 2081 can store a plurality of bytes.

The content read out from the MMU 3 is stored in the block cells 2081 of the data array 208. More specifically, the copy of a part of the entire set of instruction words in the MMU 3 is stored in the CM 2, while the copy of a part of the entire set of data in the MMU 3 is stored in the CM 6. The address array 204 and the data array 208 have similar structures. In addition, each address for accessing each block of the MMU 3 is stored in each of block address cells 2041 of the array 204. Each of the cells 2041 corresponds to each of the block cells 2081 of the data array 208. The instruction address from the unit 1, the operand address from the unit 5 or the address from the unit 8 are set in a physical address register 201. Portions 2020 and 2030 of the address field in the register 201 are used to select each set number for the address array 204 and the data array 208. The contents of all block cells in the same set selected at the array 204 are read out in parallel. Each of the contents selected on the lines 2040-1 to 2040-n is compared with a portion 2010 of the content of the register 201 by the comparison circuits 205-1 to 205-n, and these comparison results appear on lines 2050-1 2050-n.

On the other hand, the set number for the data array 208 is also selected by the content 2030, and as a result, the contents of all the block cells designated by the content 2030 are read out in parallel. Only one out of the outputs 2080-1–2080-n of the block cells thus read is selected at selection circuits 209-1 to 209-n in response to comparison result signals given through the lines 2050-1 to 2050-n and is stored in a local register 211 through an OR gate 210. If the desired instruction word or operand data does not exist in the memory 208, an address is given to the MMU 3 from the register 201, so that the desired instruction word or data is read out of MMU 3 and is given to the CM 2 or 6 through the line 31 or the line 32. Signals $C_1$-$C_n$ are used to select one block cell to store data in the cells 2081 of the set selected by the content 2030. The signals $C_1$-$C_n$ are given from a cache management circuit (not shown).

For details of the generation of such signals $C_1$-$C_n$ from the cache management circuit, reference may be made to a paper by J. Gecsei, D. R. Slutz and I. L. Traiger, entitled "Envaluation techniques for storage hierarchies", IBM System Journal, No. 2, 1970, PP. 78–117.

The above-mentioned instruction word or data from the MMU 3 is stored in the selected block cell 2081. Each address for accessing the MMU is stored in each of the block address cells 2041 of the address array 204 corresponding to each of the block cells 2081 through the line 2010 and gates 202-1 to 202-n.

Assuming now that the registers 201 and 211 operate in synchronism with each clock and the logical delay, i.e., the signal propagation delay between the registers 201 and 211 is less than one clock cycle, each of the CMs 2 and 6 assumes the structure as shown in FIG. 3B. Each of the CMs 2 and 6 operates in synchronism with each machine cycle (equal to clock cycle).

The operation of the CM 2 (or 6) shown in FIG. 3B is described hereinafter referring to FIG. 4B. A first address 1 from the units 1 (5 or 8) is supplied to 204 and at the same time, the address 1 is supplied to the data array 208, so that the arrays 204 and 208 may operate in parallel at the same address. Accordingly, during the first machine cycle, the parallel operations of the arrays 204 and 208 are made for the same address of the CM 2 (or 6) designated by the first address 1. During the second machine cycle, the parallel operations of the arrays 204 and 208 are made for the same address of the CM 2 (or 6 designated by the second address 2.

Referring to FIG. 3A, an arrangement of the address array 204 and the data array 208 is made for the case where the identical clocks are supplied in parallel to the comparison circuits 205-1 to 205-N shown in FIG. 2 and each clock is sequentially given to the registers 201 and 211. Consequently, the arrays 204 and 208 operate in parallel to each other at different addresses as shown in FIG. 4A. Referring to FIGS. 1 and 2 and FIGS. 4A and 4B, a first address 1 is supplied to the array 204 from the unit 1 (5 or 8). After one clock cycle has elapsed from the supply of the address ①, an address corresponding to the first address from the array 204 is given to the data array 208. In the same clock cycle as the address supply, that is, in the second clock cycle, a second address ② is given to the address array 204. As a result, a third address ③ is supplied to the address array 204 in the same clock cycle as the supply cycle of the second address ② to the array 208.

Figure 5A:
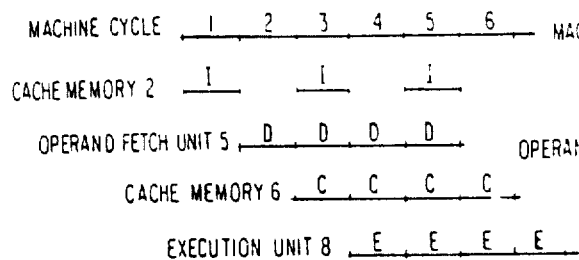
FIGS. 5A, 5B, and 5C are diagrams for the comparison of the processing operation of a DP system based on this invention with that of a conventional DP system.

Assuming that each of the CMs 2 and 6 shown in FIG. 1 is composed of the CM shown in FIG. 3B, and two instruction words are fetched at each instruction fetch operation, the operation of the DP system operation shown in FIG. 5A is performed. Compared with the FIG. 5C operation performed by the use of the conventional CM shown in FIG. 3B, the FIG. 5A operation can improve the operation efficiency or, throughput of the DP system.

Figure 5B:
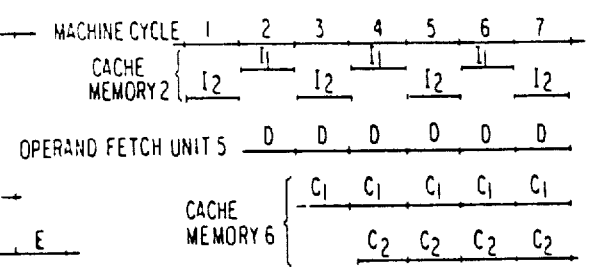

Assuming that each of the CMs 2 and 6 shown in FIG. 1 is composed of the CM shown in FIG. 3A, the throughput of the DP system can be greatly improved as shown in FIG. 5B compared with that performed by the conventional CM.

Figure 5C:
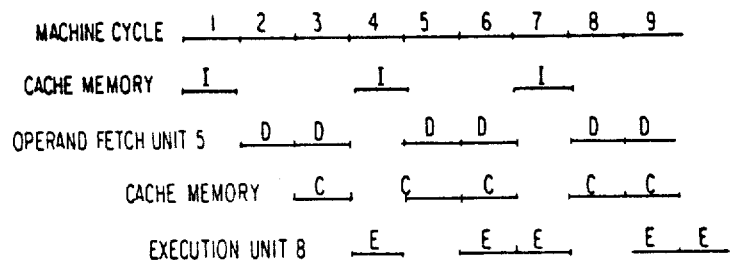

In FIGS. 5A, 5B and 5C, I denotes the instruction fetch operation for the unit 1 shown in FIG. 1; $I_1$, the address array read-out operation for the unit 1 shown in FIG. 1; $I_2$, the data array read-out operation for the unit 1 shown in FIG. 1; D, the instruction decoding operation at the decoder (not shown); C, the operand fetch operation for the unit 5; $C_1$, the address array read-out operation for the operand data fetch; $C_2$, the data array read-out operation for the operand data fetch; and E, the execution operation at the unit 8 shown in FIG. 1, respectively.

As discussed above, the CMs 2 and 6 shown in FIG. 1 have an equal capacity or, in other words, the block cell number and the number of bytes per block are made equal for each of the two CMs. As a result, the arrangement of these separate CMs 2 and 6 (referred to as "SCM" hereunder) achieves the following advantages:

The missing probability $X_p$ in the SCM is the same or lower than the missing probability $X_q$ in the conventional CM, which is not divided into two (i.e., one for the instruction words and the other for the data). This means that the missing probability may become higher unless the CMs 2 and 6 have the same capacity.

The ratio $\theta$ of the probability $X_p$ to $X_q$ is given by the following formula:

$$\theta = X_p/X_q$$

Therefore, if $\theta \div 1$, the missing probability of the SCM is almost the same as that of the conventional CM. The probabilities $X_p$ and $X_q$ are given by the following equations:

$$X_p = 1 - \sum_{k=0}^{n_I} \sum_{l=0}^{n_D} \frac{(B_I \pi_I(k) + B_D \pi_D(l)) \cdot p(k,l)}{B_I + B_D}$$

$$X_q = 1 - \sum_{k=0}^{n} \sum_{l=0}^{n-k} \frac{(B_I \pi_I(k) + B_D \pi_D(l)) \cdot q(k,l)}{B_I + B_D}$$

wherein
k is the number of the instruction blocks stored in the SCM or the conventional CM; l is the number of data blocks stored in the SCM or the conventional CM; p(k, l) is the probability that there are k instruction blocks and l data blocks in the SCM; and q (k, l) is the probability that there are k instruction blocks and l data blocks in the conventional CM.

Also, $\pi_I(k)$ and $\pi_D(l)$ are given experimentally by the following equations:

$$\pi_I(k) = 1 - (1 - \pi_I(1))k^{-\lambda_I} \quad (k=1, 2 \ldots)$$

$$\pi_D(l) = 1 - (1 - \pi_D(1))l^{-\lambda_D} \quad (l=1, 2 \ldots)$$

$$\pi_I(0) = \pi_D(0) = 0$$

wherein
$\pi_I(1)$, $\pi_D(1)$, $\lambda_I$, and $\lambda_D$ are constants and $1 - \pi_I(1)$, $1 - \pi_D(1) = 0.2 \sim 0.8$ $\lambda_I$, $\lambda_D = 1 \sim 3$
when actually measured using the high level language programs such as FORTRAN and COBOL.

Assuming now that the access operation for the MMU is performed with a width of 8 bytes in the DP system, the parameters $B_I$ and $B_D$ respectively take 0.26 and 0.64 by the calculation based on the Scientific Gibson Mix, while the parameters $B_I$ and $B_D$ takes 0.19 and 0.64 by the Bussiness Gibson Mixture method (see Column 1 of the U.S. Pat. No. 3,618,041).

As shown in FIGS. 6A–6E and 7A–7D, it is obvious that $\theta \leq 1$ is established only in the case of $n_I = (n/2)$, that is, in the case where the memory capacity of the CM 2 is equal to that of the CM 6. In this case, the memory capacity of the CM is Y·n (Y is the number of the bytes per block; and n is the total block number equal to $n = n_I + n_D$). Also, $n_I$ is the block cell number of the CM 2, and $n_D$ is the block cell number of the CM 6.

Figure 8:
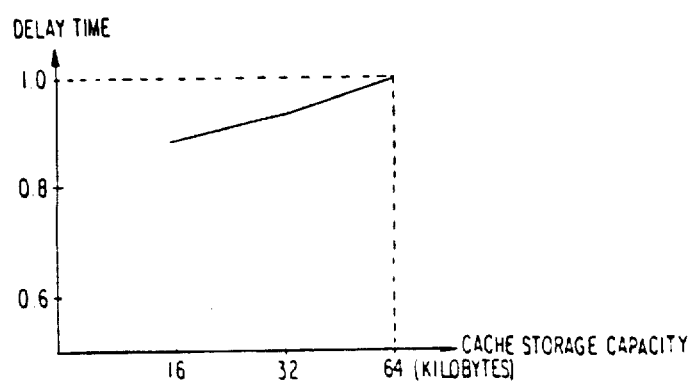
FIG. 8 is a plot of the relationship between the cache memory delay time in the cache memory and its capacity.
Figure 6A:
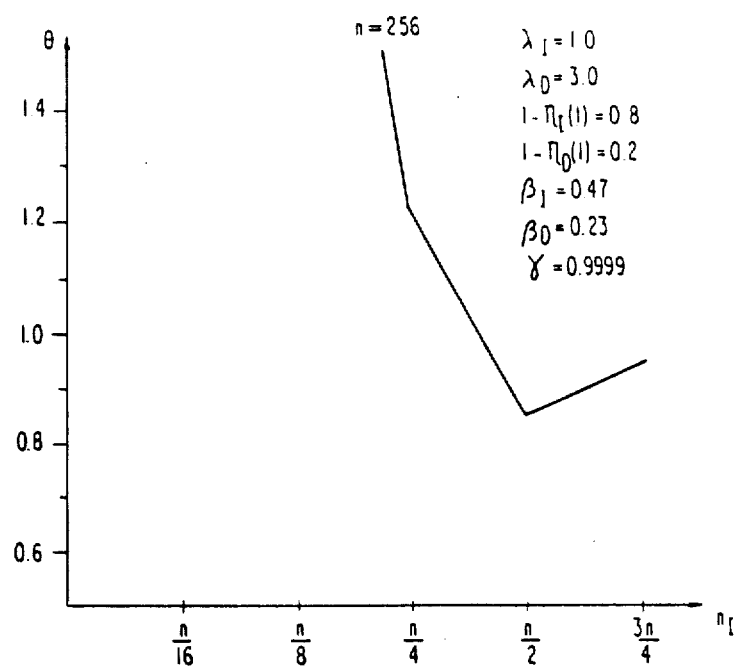
FIGS. 6A-6E are plots of the relationship of the ratio $\theta = (X_p/X_g)$ to the number of block cells, $n_I$, in the instruction cache memory where the combined number of block cells, n, in the instruction and data cache memories and the parameters $\lambda_I$, $\lambda_D$, $1 - \pi_I(1)$, $1 - \pi_D(1)$, $B_I$, $B_D$ and $\gamma$ are as stated on the respective plots.
Figure 6B:
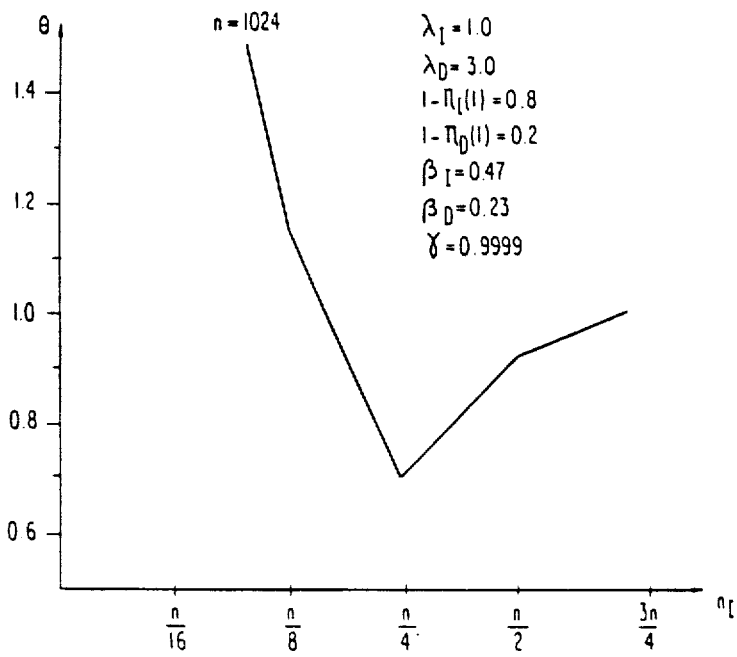
Figure 6C:
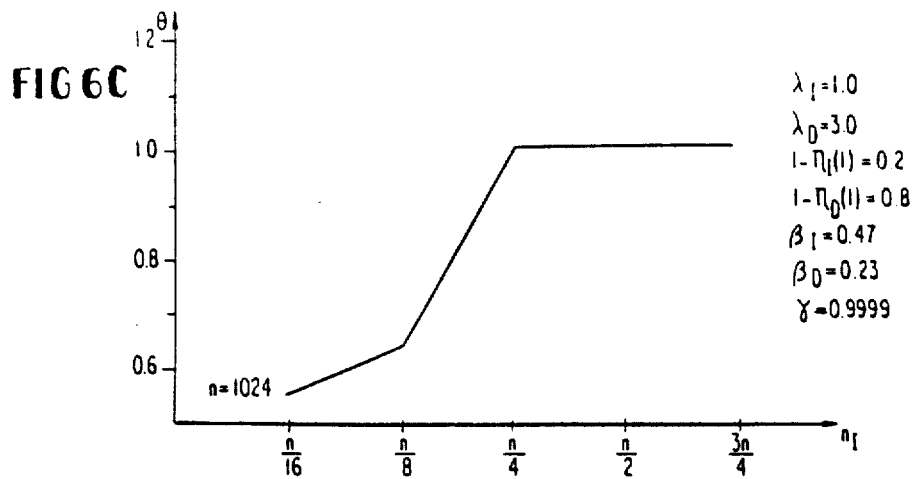
Figure 6D:
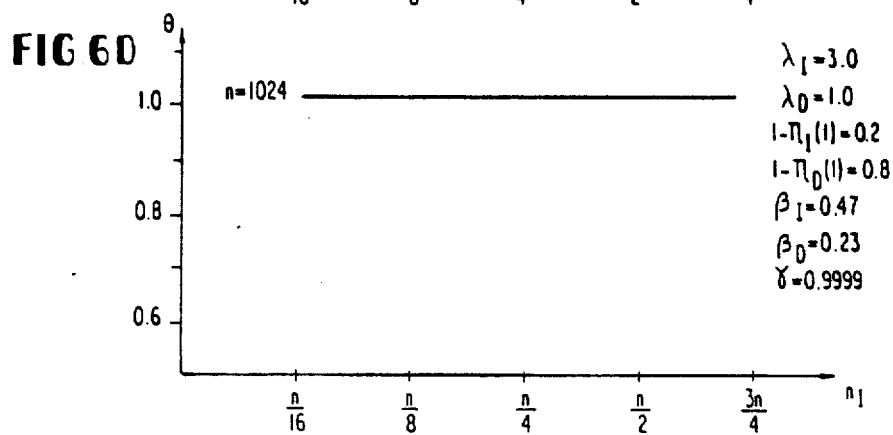
Figure 6E:
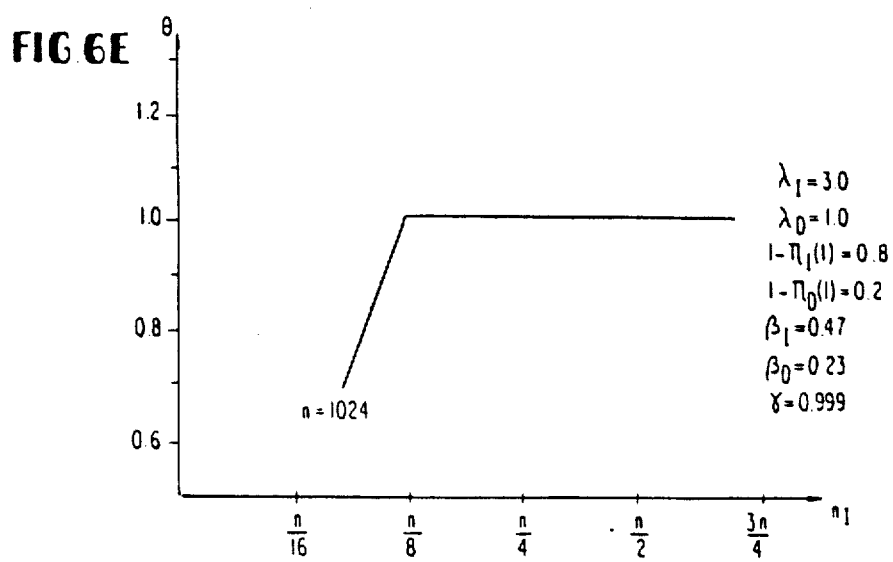

FIG. 8 shows the relationship between the cache delay time in the structure shown in FIG. 3B or the DA 208 shown in FIG. 3A and the capacity of the well-known set-associative type CM with a capacity of 32 bytes/block. Needless to say, the reduction of the cache delay time contributes to the decrease of the machine cycle time. As shown, the delay time is a relative value set at 1 when the CM has a total capacity of 64 kilobytes. For details of the set associative technique, reference may be made to U.S. Pat. No. 3,588,829. Thus, it is understood that the delay time is decreased by 7 percent for the 32-kilobyte (32-KB) memory and 11 percent for the 16-KB memory, respectively, compared to the 64-KB memory. When $n_I$ is equal to $n_D$, the cache delay time of the SCM is almost equal to that of the conventional CM which has one half of the capacity of the SCM. Therefore, as is evident from FIG. 8, the machine cycle time for the SCM can be shortened by 5 to 7 percent compared with that for the conventional CM having the same capacity as the SCM.

Assuming that the average time for executing an instruction is T; the missing probability of the CM X; the clock cycle, t; and variables $\Delta T$, $\Delta X$, and $\Delta t$, in the DP system, the following formula is obtained:

$$\frac{\Delta T}{T} = \frac{\Delta t}{t} + k \frac{\Delta x}{X}$$

wherein K is a constant, and in a large-scale DP system, it is empirically $$K = 0.1 \sim 0.2.$$

If each of the CMs 2 and 6 (SCM) has the same capacity, which is one half of the capacity of the conventional CM, the following equations are established from FIGS. 6A–6D, 7A–7D and 8:

$$\Delta X/X \leq 0,$$

$\Delta t/t = -(0.05 \sim 0.07)$.

Therefore, the DP system with such a SCM can shorten the instruction executing time by at least 5 to 7 percent than the conventional CM of the equal capacity.

Referring to FIG. 9, the second embodiment (TLB 90) comprises a logical address register 91, and an address decoder 92, a translation-look aside buffer (TLB) memory array 93, comparison circuits 94-1 to 94-$m_T$, AND gates 95-1 to 95-$m_T$, and an OR gate 96. With this embodiment, the TLB is divided into two; one for the access operation for operand data and the other for the instruction words. The connection between the TLB 90 and the CMs 2 and 6 used in the first embodiment is shown in FIGS. 10A to 10D. In the DP system having a virtual memory technique, an MMU address is given in the form of page name+displacement or segment name+displacement. As a result, the translation of the page or the segment name into the corresponding physical address of the MMU 3 is necessary. The TLB 90 performs this translating operation. The operation of the second embodiment is now described in further detail. When a portion of the page or segment name field at the logical address register 91 is given to the decoder 92 through line 911, one set is selected out of sets 1-$r_T$ of the TLB memory array 93. The contents of the compartments 1-$m_T$ of the selected set are read out in parallel. In each of the compartments is stored the address information consisting of a part of the logical address and the entire physical address of the MMU 3 corresponding to the logical address.

Each of the outputs of the TLB memory array 93 through lines 931 and 933 is compared with the content of the line 912 at comparison circuits 94-1 to 94-$m_T$. Next, one real address given from the array 93 through the lines 932 to 934 is selected by the gates 95-1 to 95-$m_T$ in response to the contents sent from lines 941 to 942. The selection result is the output of the TLB 90 through the gate 96 and appears on a line 961. The displacement field 913 of the register 91 is directly given to the CMs 2 and 6. The outputs appearing on the lines 961 and 913 are given to the register 201 shown in FIG. 2. The connection between the above-mentioned TLB, the address array (AA), and the data array (DA) shown in FIG. 10A (or 10C) corresponds to the connection between the AA and the DA shown in FIG. 3A (or 3B).

Assuming that the content of the register 201 shown in FIG. 2 is the same as the logical address for the MMU 3, the connection between the TLB, the AA, and the DA shown in FIG. 10B (or 10D) corresponds to that between the AA and the DA shown in FIG. 3A (or 3B).

In the example shown in FIG. 10A, the TLB 90 and the arrays 204 and 208 operate sequentially in response to three consecutive clocks. The array 208 shown in FIG. 10B operates in the next clock cycle after the TLB 90 and the array 204 have operated in parallel during the same one clock cycle. Whereas, in FIG. 10C, the TLB 90 operates at one clock cycle, and the arrays 204 and 208 operate during the next clock cycle in parallel, while in FIG. 10D, all of the TLB 90 and the arrays 204 and 208 operate in parallel. With the construction shown in FIGS. 10B and 10D, the TLB is divided into two (one for the instruction and the other for operand data), in addition to the use of the SCM to perform the DP system operation shown in FIGS. 5B and 5A, respectively. In the construction shown in FIGS. 10A and 10C, the division of the TLB enables a similar efficient operation to that shown in FIG. 5B or FIG. 5A. If the TLB is not divided as shown in FIG. 11, conflict between the instruction address fetch and the operand data address fetch at the TLB arises, the operation efficiency of the DP system is deteriorated in a similar way shown in FIG. 5C.

The MMU 3 and the CMs 2 and 6 may be respectively composed of MMU 2 and, BM 112, 114, 116, and 118 shown in FIG. 1 of the U.S. Pat. No. 3,618,041. TLB 90 may also be composed of Translation Look Aside Table 14 disclosed in the U.S. Pat. No. 3,761,881.

I claim:

1. In a data processing system memory address control apparatus connected to a main memory unit (MMU) and a processing unit (PU) including an instruction fetch unit, an operand fetch unit, and an execution unit, said control apparatus comprising:
    instruction address translation means coupled to said instruction fetch unit for translating exclusively logical addresses for reading out instruction words stored in the MMU into corresponding real addresses of the MMU; and
    operand data address translation means coupled to said operand fetch unit for translating exclusively logical addresses for reading out data words stored in the MMU into corresponding real addresses of the MMU;
    wherein the instruction address translation operation and the operand data address translation operation are performed in parallel and simultaneously.

* * * * *